(12) United States Patent
Ueno et al.

(10) Patent No.: US 9,156,991 B2
(45) Date of Patent: Oct. 13, 2015

(54) PROCESS FOR PRODUCING RESIN-COATED PIGMENT, RESIN-COATED PIGMENT, AQUEOUS PIGMENT DISPERSION AND AQUEOUS COLORANT COMPOSITION CONTAINING THE SAME

(75) Inventors: Yoshiaki Ueno, Osaka (JP); Hideo Hisamoto, Osaka (JP); Akemi Hisamoto, legal representative, Toyonaka (JP); Tomohiro Kita, Osaka (JP); Akinori Moriyama, Osaka (JP); Kayoko Ishizaki, Osaka (JP)

(73) Assignee: SAKATA INX CORP., Osaka (JP)

( * ) Notice: Subject to any disclaimer, the term of this patent is extended or adjusted under 35 U.S.C. 154(b) by 1667 days.

(21) Appl. No.: 11/597,385

(22) PCT Filed: May 25, 2005

(86) PCT No.: PCT/JP2005/009563
§ 371 (c)(1),
(2), (4) Date: Feb. 8, 2008

(87) PCT Pub. No.: WO2005/116147
PCT Pub. Date: Dec. 8, 2005

(65) Prior Publication Data
US 2008/0262122 A1    Oct. 23, 2008

(30) Foreign Application Priority Data
May 26, 2004 (JP) .................................. 2004-156693

(51) Int. Cl.
| C08F 6/00 | (2006.01) |
| C08K 11/00 | (2006.01) |
| C09C 1/56 | (2006.01) |
| C09C 3/10 | (2006.01) |
| C09D 11/037 | (2014.01) |
| C09D 11/17 | (2014.01) |
| C09D 11/322 | (2014.01) |
| C09D 17/00 | (2006.01) |

(52) U.S. Cl.
CPC ... *C09C 1/56* (2013.01); *C09C 3/10* (2013.01); *C09D 11/037* (2013.01); *C09D 11/17* (2013.01); *C09D 11/322* (2013.01); *C09D 17/001* (2013.01)

(58) Field of Classification Search
USPC .................. 523/310, 160, 161; 428/403, 404
See application file for complete search history.

(56) References Cited

U.S. PATENT DOCUMENTS

| 3,956,005 | A | * | 5/1976 | Sugahara et al. | 106/434 |
| 4,769,079 | A | * | 9/1988 | Clark et al. | 106/402 |
| 4,769,080 | A | * | 9/1988 | Clark et al. | 106/402 |
| 4,773,936 | A | * | 9/1988 | Clark et al. | 106/402 |
| 5,015,687 | A | * | 5/1991 | Hahn et al. | 524/512 |
| 6,136,907 | A | * | 10/2000 | Sunamori et al. | 524/430 |
| 6,648,959 | B1 | * | 11/2003 | Fischer et al. | 106/487 |
| 7,914,893 | B2 | * | 3/2011 | Handrosch et al. | 428/403 |
| 2003/0040561 | A1 | * | 2/2003 | Shibato et al. | 524/155 |
| 2004/0081913 | A1 | * | 4/2004 | Mori | 430/271.1 |
| 2004/0097645 | A1 | * | 5/2004 | Weitzel et al. | 524/803 |
| 2004/0204514 | A1 | * | 10/2004 | Sunamori et al. | 523/160 |
| 2007/0157848 | A1 | * | 7/2007 | Miyabayashi | 106/31.13 |

FOREIGN PATENT DOCUMENTS

| JP | 2003-268278 | | 9/2003 | |
| JP | 2003268278 A | * | 9/2003 | ............. C09D 11/00 |
| JP | 2003-286424 | | 10/2003 | |
| JP | 2004-43630 | | 2/2004 | |
| JP | 2004043630 A | * | 2/2004 | ............. C09B 67/46 |
| KR | 10-2004-0079921 | | 9/2004 | |
| WO | WO 01/55263 A1 | * | 8/2001 | |
| WO | 03/057784 | | 7/2003 | |
| WO | WO 03/057784 A2 | | 7/2003 | |

OTHER PUBLICATIONS

English Translation submitted by the applicant. JP 2004043630 A, Feb. 2004 Japan, Murata et al.*
"Acid Number". Hawley's Condensed Chemical Dictionary, 14th Edition, 2002. Obtained via Knovel.com.*
"Ion Exchange Reaction". pp. 1-3. Obtained from http://chemistry.wustl.edu/~courses/genchem/Labs/IonExchange/Reactions.htm. No Author, No Date.*
Supplementary European Search Report dated Jul. 30, 2010.
Korean Notice of Allowance issued for Korean Patent Application No. 10-2006-7023477 dated Jul. 25, 2012.

* cited by examiner

*Primary Examiner* — Mark Eashoo
*Assistant Examiner* — Michael A Salvitti
(74) *Attorney, Agent, or Firm* — Kratz, Quintos & Hanson, LLP

(57) ABSTRACT

A process for producing a resin-coated pigment capable of providing an ink and a paint being superior in dispersion stability of a pigment and having rapid drying property, high gloss and density without containing those such as an organic solvent and a salt that cause the lowering of performance of pigment dispersion, characterized in that a pigment is dispersed in an aqueous solution in which an anionic group-containing resin is dissolved in the presence of a basic compound and then, the anionic group-containing resin is precipitated on the surface of the pigment by removing the basic compound in the aqueous solution, using an ion exchange means.

9 Claims, No Drawings

PROCESS FOR PRODUCING RESIN-COATED PIGMENT, RESIN-COATED PIGMENT, AQUEOUS PIGMENT DISPERSION AND AQUEOUS COLORANT COMPOSITION CONTAINING THE SAME

TECHNICAL FIELD

The present invention relates to a process for producing a resin-coated pigment, a resin-coated pigment, an aqueous pigment dispersion and an aqueous colorant composition containing the same.

BACKGROUND ART

As a colorant for various inks and paints, dyes are used in a field requiring higher level of sharpness and printing or coating property and on the other hand, pigments are used for a field requiring water resistance and light resistance, and in particular, the tendency is remarkable in the field of an ink for ink jet recording. A conventional ink jet recording system has been developed from the viewpoint that the maximum problem to be solved is how superior image sharpness and stable spouting property can be imparted to ink. However, the number of prevailed digital cameras has been greatly increased recently because of easy handling and high image quality and the target of ink jet recording extends to the field of silver salt photography. Accordingly, the impartation of light resistance is going to be a problem on par with the sharpness so that color is not faded nevertheless long preservation. Therefore, conventional dyes are going to be rapidly converted to pigments as the colorant of ink, but there remain many problems that must be solved when pigments are utilized.

For example, since a dye is dissolved in dispersion medium in molecular state, it affects little flowability and re-dissolving property dominating the spouting property of the ink even after elapsed time or a concentrated state and can keep high spouting stability. However, a pigment existing in particle state easily causes phenomena such as coagulation, sedimentation and solidification, and such phenomena lower flowability and re-dissolving property and as a result, the spouting stability is deteriorated. In particular, an organic pigment superior in sharpness must be dispersed as fine particles in aqueous medium in the ink jet recording system requiring high sharpness, whereby the area of hydrophobic surface is increased to inevitably cause coagulation.

For dispersing a pigment in an aqueous medium, methods for wetting the hydrophobic surface of the pigment using a dispersant and stably dispersing it in the aqueous medium are usually used. Among them, a method of adsorbing a surfactant or a polymer compound on the surface of a pigment is widely used. However, a strong adsorption force is required for keeping the dispersion state of the pigment and there are little dispersants exhibiting good pigment dispersibility for a long period. Further, since a large quantity of a dispersant is necessary for improving the dispersibility of a pigment by the method, the disengagement speed of the aqueous medium from the system becomes slow and when it is applied to the above-mentioned ink for ink jet recording, there are problems that the drying property of ink is lowered, the pigment is diffused in the inside of a printed article and printing density is also lowered.

Consequently, a method of coating the surface of a pigment with a film forming resin to obtain a resin-coated pigment is proposed as a method of improving the dispersion stability of the pigment and not causing the lowering of drying property and density of a printed article. For example, there are disclosed methods including a method of coating an anionic group-containing resin on the surface of a pigment by a phase transfer emulsification method (JP 10-046075 A and JP 10-140065 A) and a method of coating an anionic group-containing resin on the surface of a pigment by an acid precipitation method (JP 10-140065 A and JP 09-031360 A). In the phase transfer emulsification method, a dispersion in which a pigment is dispersed in an organic solvent solution of an anionic group-containing resin neutralized with a basic compound is prepared, the dispersion is mixed with a large quantity of an aqueous medium, and then, the organic solvent is removed if necessary, to obtain an aqueous pigment dispersion containing a resin-coated pigment. In the acid precipitation method, a pigment is dispersed in an aqueous solution in which an anionic group-containing resin has been dissolved in the presence of a basic compound, and then an acidic compound is added to adjust pH to neutral or acidic condition, thereby coating the surface of the pigment with the anionic group-containing resin to obtain a pigment cake, and then, the resin-coated pigment is dispersed again using a basic compound, to obtain an aqueous pigment dispersion with good dispersibility.

However, when the phase transfer emulsification method is used, the resin is really interacted with only an organic solvent in dispersing a pigment; therefore the expected effect of dispersing the pigment is not obtained. Further, since a large quantity of organic solvent remains in the system, storage stability is lowered and on the other hand, if excessive organic solvent is removed, there is a problem that it is not economically advantageous. When the acid precipitation method is used, the system contains the salt of acid and base which causes the lowering of various performances that are required for the ink for ink jet recording, and there is a problem that adequate washing is required for removing the salt.

DISCLOSURE OF INVENTION

It is a problem of the present invention to provide a resin-coated pigment capable of providing an ink or a paint being superior in dispersion stability of a pigment and having rapid drying property, high gloss and density without containing those such as an organic solvent and a salt that cause the lowering of performance of pigment dispersion, an aqueous pigment dispersion using the same, and an aqueous colorant composition containing the aqueous pigment dispersion.

The present inventors have carried out studies for solving the above-mentioned problem and as a result, have developed a quite novel process for producing a resin-coated pigment wherein a pigment is dispersed in an aqueous medium by using an anionic group-containing resin solubilized with a basic compound as a dispersant (this step is the same as the step in a conventional process for producing an aqueous pigment dispersion), and then the basic compound in the aqueous medium is removed using an ion exchange means to precipitate the anionic group-containing resin on the surface of the pigment (hereinafter, "to precipitate a resin" on the surface of a pigment is occasionally represented as "coated with a resin"). Further, a pigment dispersion obtained by neutralizing a portion or all of the anionic group of the thus obtained resin-coated pigment of the present invention using a basic compound and dispersing it into an aqueous medium (hereinafter, this dispersion treatment is occasionally called as re-dispersion) is extremely superior in dispersion stability of a pigment. Further, it has been found out that the re-dispersion of the resin-coated pigment contains extremely little amount of a resin not adsorbed on the pigment in the system, as compared with an aqueous pigment dispersion obtained by using an anionic group-containing resin merely as a dispersant and further an aqueous pigment dispersion obtained by using the phase transfer emulsification method or the acid precipitation method. As a result, an aqueous colorant composition using the aqueous pigment dispersion, in particular, an aqueous ink composition for ink jet recording, is superior in storage stability, good in spouting stability, high in density and superior in drying property, vividness and gloss.

The reason is deduced as follows: In the method of precipitating an anionic group-containing resin on the surface of a pigment by using an ion exchange means, an organic solvent and a salt do not intervene, which is advantageous for enhancing adsorption force between the pigment and the resin, and this state can be kept even if it is perfectly neutralized with a basic compound. Further, since the amount of a resin not adsorbed on the pigment is little, high solid content and low viscosity can be achieved and the permeation of the aqueous medium into a printed article is accelerated and as a result drying property and color density can be also improved.

Further, it has been found in the present invention that when the removal of a basic compound by ion exchange means is partially carried out within a range not causing precipitation of the resin-coated pigment in the process for producing the fore-mentioned resin-coated pigment, an aqueous pigment dispersion with good pigment dispersibility can be directly produced without requiring a step of re-dispersing the resin-coated pigment using the basic compound.

Thus, the present inventors have found that all of the problems of the above-mentioned prior art can be solved by the process for producing a resin-coated pigment utilizing an ion exchange means and have completed the present invention.

The present invention provides a process for producing a resin-coated pigment, a resin-coated pigment, an aqueous pigment dispersion and an aqueous colorant composition as mentioned below.

(1) A process for producing a pigment coated with a resin, comprising the steps of:

dispersing a pigment into an aqueous solution in which an anionic group-containing resin is dissolved in the presence of a basic compound, and then removing the basic compound in the aqueous solution by using an ion exchange means to precipitate the anionic group-containing resin on the surface of the pigment.

(2) The process for producing a pigment coated with a resin of the fore-mentioned item (1), wherein the basic compound in the aqueous solution is removed by replacing the cation of the basic compound by a hydrogen ion, using an organic ion exchanger and/or an inorganic ion exchanger as the ion exchange means.

(3) The process for producing a pigment coated with a resin of the fore-mentioned item (2), wherein substantially the whole amount of the basic compound in the aqueous solution is removed.

(4) The process for producing a pigment coated with a resin of the fore-mentioned item (2), wherein the ion exchange is carried out until the pH of the aqueous solution is less than 4.

(5) The process for producing a pigment coated with a resin of any one of the fore-mentioned items (1) to (4), wherein the acid value of the anionic group-containing resin is 40 to 300 KOH mg/g.

(6) A pigment coated with a resin produced by the process of any one of the fore-mentioned items (1) to (5).

(7) An aqueous pigment dispersion obtained by dispersing the pigment coated with a resin of the fore-mentioned item (6) in an aqueous medium using a basic compound.

(8) A process for producing an aqueous pigment dispersion, comprising the steps of:

dispersing a pigment into an aqueous solution in which an anionic group-containing resin is dissolved in the presence of a basic compound, and then partially removing the basic compound in the aqueous solution by using an ion exchange means.

(9) The process for producing an aqueous pigment dispersion of the fore-mentioned item (8), wherein the basic compound in the aqueous solution is partially removed by replacing a portion of the cation of the basic compound by a hydrogen ion, using an organic ion exchanger and/or an inorganic ion exchanger as the ion exchange means.

(10) The process for producing an aqueous pigment dispersion of the fore-mentioned item (9), wherein the ion exchange is carried out until the pH of the aqueous solution is within a range of 4 to 8.

(11) The process for producing an aqueous pigment dispersion of any one of the fore-mentioned items (8) to (10), wherein the acid value of the anionic group-containing resin is 40 to 300 KOH mg/g.

(12) An aqueous colorant composition comprising the aqueous pigment dispersion of the fore-mentioned item (7).

(13) The aqueous colorant composition of the fore-mentioned item (12), which is an aqueous ink composition for ink jet recording.

(14) An aqueous colorant composition comprising the aqueous pigment dispersion obtained by the process of any one of the fore-mentioned items (8) to (11).

(15) The aqueous colorant composition of the fore-mentioned item (14), which is an aqueous ink composition for ink jet recording.

In accordance with the present invention, a resin-coated pigment is obtained by a novel process wherein a pigment is dispersed into an aqueous solution in which an anionic group-containing resin is dissolved in the presence of a basic compound, and then, a portion or whole of the basic compound in the aqueous solution is removed by using an ion exchange means to precipitate the anionic group-containing resin on the surface of the pigment. An aqueous pigment dispersion containing the resin-coated pigment obtained by the process is superior in storage stability and provides coating film with high density, and superior vividness and gloss.

BEST MODE FOR CARRYING OUT THE INVENTION

The process for producing a resin-coated pigment, the resin-coated pigment, the aqueous pigment dispersion and the aqueous colorant composition in accordance with the present invention are specifically described below.

Firstly, in the process for producing a resin-coated pigment in accordance with the present invention, a pigment is added to an aqueous solution in which an anionic group-containing resin is dissolved in the presence of a basic compound (preferably, the pigment and the anionic group-containing resin are added so that the amount (on a solid basis) of the anionic group-containing resin is 10 to 100 parts by weigh based on 100 parts by weight of the pigment), and the pigment is dispersed by a dispersing machine such as a mill type dispersing machine or a high pressure dispersing machine. Then, the resultant pigment dispersion, after being diluted if necessary, undergoes ion exchange of the cation of the basic compound with hydrogen ion by directly adding an organic ion exchanger and/or an inorganic ion exchanger to the pigment dispersion, or by passing the pigment dispersion through an ion exchange column packed with such an ion exchanger, thereby precipitating (coating) the anionic group-containing resin on the surface of the pigment. Further, if necessary, filtration, washing with water and drying are carried out to obtain a resin-coated pigment. The resin-coated pigment can be used in a moisture-containing cake state, a dry state or a state dispersed in an appropriate medium.

The resin-coated pigment obtained by the above-mentioned production process is used for uses such as toner as a dry composition or for an aqueous pigment dispersion as uses of various wet compositions.

The pigment applicable for the process for producing a resin-coated pigment in accordance with the present invention is not specifically limited. Examples thereof include inorganic pigments such as carbon black, titanium black, titanium white, zinc sulfide and iron oxide red, and organic pigments such as a quinacridone pigment, a dioxazine pigment, a phthalocyanine pigment, an anthrapyrimidine pigment, an anthanthrone pigment, an indanthrone pigment, a flavanthrone pigment, a perylene pigment, a diketopyrrolopyrrole pigment, a perinone pigment, a quinophthalone pigment, an anthraquinone pigment, a thioindigo pigment, a benzimidazolone pigment, an isoindolinone pigment, an azomethine pigment and an azo pigment.

As the anionic group including resin applicable for the process for producing the resin-coated pigment of the present invention, any anionic group-containing resins that can be utilized for pigment dispersion or as binders for usual inks and paints can be used without particular limitation as long as it can be dissolved in an aqueous medium in the presence of a basic compound, but a resin containing one or at least two of anionic groups such as a carboxyl group, a sulfonic acid group and a phosphono group ($-P(=O)(OH)_2$) that can be dissolved in an aqueous medium in the presence of a basic compound is preferably used.

The acid value of the anionic group-containing resin is preferably 40 to 300 KOH mg/g and more preferably 70 to 250 KOH mg/g. When the acid value of the anionic group-containing resin is lower than the range, the dispersion stability of the aqueous dispersion of the resin-coated pigment obtained is occasionally lowered and on the other hand, when it is more than the range, hydrophilic property is excessively high; therefore the storage stability and water resistance are occasionally lowered.

Further, the anionic group-containing resin preferably has a hydrophobic portion for mainly improving adsorbtion to a pigment and/or a hydrophilic portion for exhibiting action effective for prevention of coagulation in an aqueous medium, in a molecule. As the hydrophobic portion introduced in a molecule, hydrophobic groups such as a long chain alkyl group and an alicyclic or aromatic cyclic hydrocarbon group are exemplified, and as the hydrophilic portion introduced in a molecule, hydrophilic groups such as a (poly) oxyalkylene chain, a basic nitrogen-containing group, a hydroxyl group and an epoxy group are exemplified.

The anionic group-containing resin preferably has a weight average molecular weight of 3,000 to 200,000 usually, more preferably 7,000 to 100,000.

Typical examples of the anionic group-containing resin include anionic group-containing resins such as an acrylic copolymer resin obtained by copolymerizing an anionic group-containing radically polymerizable monomer with other radically polymerizable monomer, and a maleic acid based copolymer resin, and anionic group-containing resins such as a polyester resin and a polyurethane resin that are obtained by condensation polymerization reaction.

The materials for synthesizing the anionic group-containing resin are disclosed in, for example, JP 2000-94825 A. Acrylic copolymer resins, maleic acid based copolymer resins, polyester resins and polyurethane resins resin that are obtained by using the materials described in the publication, can be utilized. Of course, resins obtained by using other materials can be also utilized.

As the anionic group-containing resin, for example, there can be used those that are obtained by polymerizing a mixture of an anionic group-containing monomer with other monomer that is suitably selected in accordance with purpose for use and is copolymerizable with the anionic group-containing monomer, in the presence of a usual radical generating agent (for example, such as benzoyl peroxide, tert-butylperoxy benzoate and azobisisobutyronitrile) in a solvent.

The anionic group-containing monomers include, for example, monomers having at least one anionic group selected from the group consisting of a carboxyl group, a sulfonic acid group and a phosphono group, and among these, a monomer having a carboxyl group is preferable in particular.

Examples of the monomer having a carboxyl group include acrylic acid, methacrylic acid, crotonic acid, itaconic acid, maleic acid, fumaric acid, 2-carboxyethyl (meth)acrylate, 2-carboxypropyl (meth)acrylate, maleic anhydride, fumaric anhydride and maleic acid half ester.

Examples of the monomer having a sulfonic acid group include sulfoethyl methacrylate.

Examples of the acryl monomer having a phosphono group include phosphonoethyl methacrylate.

Then, other monomers copolymerizable with the anionic group-containing monomer are explained.

In order to introduce the hydrophobic portion or the hydrophilic portion in a molecule, a method of synthesizing a resin using a monomer having such a portion can be utilized.

Examples of usable hydrophobic group-containing monomer include monomers having a long chain alkyl group such as alkyl esters of radically polymerizable unsaturated carboxylic acid wherein the alkyl group has at least 8 carbon atoms (e.g. 2-ethylhexyl (meth)acrylate, octyl (meth)acrylate, lauryl (meth)acrylate, stearyl (meth)acrylate, and 2-hydroxystearyl (meth)acrylate), alkyl vinyl ethers wherein the alkyl group has at least 8 carbon atoms (e.g. dodecyl vinyl ether), and vinyl esters of fatty acid having at least 8 carbon atoms (e.g. vinyl 2-ethylhexanoate, vinyl laurate, and vinyl stearate); monomers having an alicyclic hydrocarbon group such as cyclohexyl (meth)acrylate; and monomers having an aromatic hydrocarbon group (e.g. benzyl (meth)acrylate, styrene monomers such as styrene, α-styrene, and vinyl toluene). Examples of usable hydrophilic group-containing monomer include monomers having a (poly)oxyalkylene chain such as ester products of (poly)alkylene glycols whose one terminal is blocked with an alkyl group (e.g. methoxypolyethylene glycol, methoxypolyethylene-polypropylene glycol, ethoxypolyethylene glycol, ethoxypolyethylene-polypropylene glycol, propoxypolyethylene glycol and propoxypolyethylene-polypropylene glycol) with radically polymerizable unsaturated carboxylic acids such as (meth) acrylic acid, and adducts of ethylene oxide and/or adducts of propylene oxide to radically polymerizable unsaturated carboxylic acid such as (meth)acrylic; basic group-containing monomers such as vinylpyrrolidones (e.g. 1-vinyl-2-pyrrolidone and 1-vinyl-3-pyrrolidone), vinylpyridines (e.g. 2-vinylpyridine, 4-vinylpyridine, 5-methyl-2-vinylpyridine and 5-ethyl-2-vinylpyridine), vinylimidazoles (e.g. 1-vinylimidazole and 1-vinyl-2-methylimidazole), vinylpiperidines (e.g. 3-vinylpiperidine and N-methyl-3-vinylpiperidine), and nitrogen-containing derivatives of (meth)acrylic acid (e.g. dimethylaminoethyl (meth)acrylate, diethylaminoethyl (meth)acrylate, tert-butylaminoethyl (meth)acrylate, (meth) acrylamide, N-methylol (meth)acrylamide, N-butoxymethyl (meth)acrylamide, N-methoxy (meth)acrylamide, N-ethoxy (meth)acrylamide, N-dimethyl acrylamide and N-propyl acrylamide); monomers having a hydroxyl group such as hydroxyalkyl esters of (meth)acrylic acid (e.g. hydroxyethyl (meth)acrylate and hydroxypropyl (meth)acrylate); and monomers having an epoxy group such as glycidyl (meth) acrylate.

Examples of other monomers include alkyl esters of (meth) acrylic acid wherein the alkyl group has less than 8 carbon atoms, such as methyl (meth)acrylate, ethyl (meth)acrylate, propyl (meth)acrylate, isopropyl (meth)acrylate, butyl (meth) acrylate and hexyl (meth)acrylate.

The basic compounds used for dissolving an anionic group-containing resin in an aqueous medium include inorganic basic compounds such as sodium hydroxide and potassium hydroxide, and organic basic compounds such as ammonia, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine and N-ethylmorpholine. These basic compounds can be used alone or in combination of two or more species thereof. Among these, alkanol amines such as monoethanolamine, N,N-dimethylethanolamine, N,N-diethylethanolamine, N,N-dibutylethanolamine, diethanolamine, N-methyldiethanolamine and triethanolamine are preferable. The amount of the basic compound used may be an amount at which the anionic group-containing resin can be dissolved in an aqueous medium and is usually within a range of 80 to 120% of the quantity required for neutralization. Of course, the basic compound can be used at an amount exceeding the range.

As the aqueous medium for dissolving the anionic group-containing resin, water or a mixture of water and a water-miscible organic solvent can be used. Examples of the water-miscible organic solvent include lower alcohols such as methyl alcohol, ethyl alcohol, isopropyl alcohol and n-propyl alcohol; polyvalent alcohols such as ethylene glycol, propylene glycol, diethylene glycol, dipropylene glycol and glycerin; monoalkyl ethers of (poly)alkylene glycol such as ethylene glycol monomethyl ether, ethylene glycol monoethyl ether, propylene glycol monomethyl ether, propylene glycol monoethyl ether, diethylene glycol monomethyl ether and diethylene glycol monoethyl ether; and monofatty acid esters of (poly)alkylene glycol such as ethylene glycol monoacetate and propylene glycol monoacetate. These water-miscible organic solvents can be used alone or in combination of two or more species thereof.

As the ion exchange means that can be applied to the process for producing a resin-coated pigment in accordance with the present invention, an organic ion exchanger, an inorganic ion exchanger and a combination thereof can be used. As the organic ion exchanger and the inorganic ion exchanger, any organic or inorganic ion exchanger may be used as long as it has ion exchange ability for replacing the cation of the basic compound by hydrogen may be used, and for example, ion exchange resins and inorganic ion exchangers can be used. More specifically, the ion exchange resins include those having ion exchange group such as a carboxyl group, a sulfonic acid group or a phosphono group on resin substrates such as styrene resin, acrylic resin, phenol resin, aliphatic hydrocarbon resin and pyridine based resin; and the inorganic ion exchangers include inorganic laminar clay minerals and zeolite.

In one embodiment of the process for producing a resin-coated pigment in accordance with the present invention, when the basic compound in the dispersion obtained by dispersing a pigment in an aqueous solution in which an anionic group-containing resin is dissolved in the presence of the basic compound is removed by ion exchange, the basic compound existing in the system is removed until a resin-coated pigment is precipitated or the system becomes a paste-like state (hereat, the paste-like state means a state in which a resin-coated pigment is precipitated when the paste is diluted with an aqueous medium). Specifically, for example, the ion exchange is carried out until the pH of the system is less than about 4 or all of the basic compound existing in the system is substantially removed. Under the condition, nearly all amount of the anionic group-containing resin in the system can be precipitated on the surface of the pigment, so that a resin-coated pigment is precipitated or the system becomes a paste-like state. The resultant precipitate is filtered off, washed with water and if necessary, dried to give a resin-coated pigment. The resin-coated pigment can be used in a state of moisture-containing cake or in a dry state.

Then, in the process for producing an aqueous pigment dispersion in accordance with the present invention, a portion or all of the anionic group-containing resin in the resin-coated pigment produced as mentioned above is neutralized with a basic compound and the resultant is dispersed again in an aqueous medium using any of various dispersing machines to give an aqueous pigment dispersion superior in dispersion stability. The amount of the basic compound used is preferably 10 to 300%, more preferably 50 to 120%, based on the acid value of the anionic group of the anionic group-containing resin. When the solid concentration of the aqueous pigment dispersion obtained is low, the solid concentration is heightened by a method such as ultrafiltration. The content (on a solid basis) of the resin-coated pigment contained in the aqueous pigment dispersion obtained is preferably 70% by weight or less, more preferably 2 to 60% by weight, still more preferably 10 to 50% by weight, based on the total amount of the aqueous pigment dispersion.

The aqueous medium and the basic compound used for preparing the aqueous pigment dispersion are suitably selected from the materials used in the process for producing the resin-coated pigment in accordance with their use.

In another embodiment of the process for producing an aqueous pigment dispersion in accordance with the present invention, when the basic compound in the dispersion obtained by dispersing a pigment in an aqueous solution in which an anionic group-containing resin is dissolved in the presence of the basic compound is removed by ion exchange in the above-mentioned process for producing the resin-coated pigment, the basic compound existing in the system is partially removed within a range not causing precipitation of the resin-coated pigment. The range not causing precipitation of the resin-coated pigment varies depending on the hydrophobic degree or hydrophilic degree of the anionic group-containing resin, the weight average molecular weight of the anionic group-containing resin and the kind of the aqueous medium used, but the ion exchange is preferably carried out until the pH of the dispersion is about 4 to 8. Since a portion of the anionic groups of the anionic group-containing resin precipitated on the surface of the pigment is neutralized by the basic compound and ionized under the condition, a resin-coated pigment prepared is superior in dispersibility. When this process for producing the aqueous pigment dispersion in accordance with the present invention is used, an aqueous pigment dispersion superior in pigment dispersibility can be directly obtained without the step of re-dispersion of the resin-coated pigment once produced. The basic compound used in the embodiment is suitably selected from the basic compounds used in the process for producing the resin-coated pigment, considering pigment dispersibility and the use of the objective product.

The aqueous pigment dispersion of the present invention, in which a resin, various additives and water-soluble solvent are added if necessary, is used for uses such as printing inks, paints, inks for writing instruments, inks for ink jet recording and liquid cosmetics. In particular, it is the aqueous pigment dispersion having extremely superior effect in a field requiring satisfactory pigment dispersibility and dispersion stability, rapid drying property, high gloss and high density.

Then, an aqueous ink composition for ink jet recording containing the aqueous pigment dispersion is described.

The aqueous ink composition for ink jet recording in accordance with the present invention can be produced by adding a water-soluble resin, a surfactant, an antiseptic, a viscosity regulator, a pH adjuster and a chelating agent if necessary in addition to the aqueous pigment dispersion, a water-miscible organic solvent and water and mixing the mixture with a simple agitating apparatus such as a Disper.

The content of the aqueous pigment dispersion in the aqueous ink composition for ink jet recording in accordance with the present invention is preferably 1 to 100% by weight, more preferably 5 to 100% by weight, considering the color density, fine definition, transparency and chromaticness required for the aqueous ink composition for ink jet recording.

As the water-miscible solvent used for producing the aqueous ink composition for ink jet recording in accordance with the present invention, the same solvent as those used for obtaining the resin-coated pigment and the aqueous pigment dispersion can be used and among these, polyvalent alcohols and ethers are preferable.

EXAMPLES

The present invention is specifically described below on the basis of Examples, but the present invention is not limited to these Examples. Hereinafter, parts and % mean parts by weight and % by weight respectively unless otherwise noticed.

<Preparation Example of Anionic Group-containing Resin>
[Anionic Group-containing Resin 1]

Into a four necked flask equipped with a stirrer, a condenser and a nitrogen gas introducing pipe was placed 180 parts of butyl acetate, and the content was heated to 100° C. A mixture of 7.7 parts of methacrylic acid, 21.8 parts of methyl methacrylate, 70.5 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 1 with a weight average molecular weight of 11,000 and an acid value of 50 mg KOH/g.

KAYA ESTER O-50TL: 50% toluene solution of t-butylperoxy 2-ethylhexanoate represented by the under-mentioned formula.

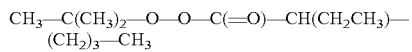

[Anionic Group-containing Resin 2]

Into a four necked flask equipped with a stirrer, a condenser and a nitrogen gas introducing pipe was placed 180 parts of butyl acetate, and the content was heated to 100° C. A mixture of 12.3 parts of methacrylic acid, 20.7 parts of methyl methacrylate, 67.0 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 2 with a weight average molecular weight of 10,000 and an acid value of 80 mg KOH/g.

[Anionic Group-containing Resin 3]

Into a four necked flask equipped with a stirrer, a condenser and a nitrogen gas introducing pipe was placed 180 parts of butyl acetate, and the content was heated to 100° C. A mixture of 18.4 parts of methacrylic acid, 19.3 parts of methyl methacrylate, 62.3 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 3 with a weight average molecular weight of 10,000 and an acid value of 120 mg KOH/g.

[Anionic Group-containing Resin 4]

Into a four necked flask equipped with a stirrer, a condenser and a nitrogen gas introducing pipe was placed 180 parts of butyl acetate, and the content was heated to 100° C. A mixture of 22.3 parts of methacrylic acid, 18.3 parts of methyl methacrylate, 59.4 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 4 with a weight average molecular weight of 12,000 and an acid value of 145 mg KOH/g.

[Anionic Group-containing Resin 5]

Into a four necked flask equipped with a stirrer, a condenser and a nitrogen gas introducing pipe was placed 180 parts of butyl acetate, and the content was heated to 100° C. A mixture of 24.5 parts of methacrylic acid, 17.9 parts of methyl methacrylate, 57.6 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 5 with a weight average molecular weight of 12,000 and an acid value of 160 mg KOH/g.

[Anionic Group-containing Resin 6]

Into a four necked flask equipped with a stirrer, a condenser and a nitrogen gas introducing pipe was placed 180 parts of butyl acetate, and the content was heated to 100° C. A mixture of 30.6 parts of methacrylic acid, 16.4 parts of methyl methacrylate, 53.0 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 6 with a weight average molecular weight of 11,000 and an acid value of 200 mg KOH/g.

[Anionic Group-containing Resin 7]

Into a four necked flask equipped with a stirrer, a condenser and a nitrogen gas introducing pipe was placed 180 parts of butyl acetate, and the content was heated to 100° C. A mixture of 36.7 parts of methacrylic acid, 14.9 parts of methyl methacrylate, 48.4 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 7 with a weight average molecular weight of 12,000 and an acid value of 240 mg KOH/g.

[Anionic Group-containing Resin 8]

Into a four necked flask equipped with a stirrer, a condenser and a nitrogen gas introducing pipe was placed 180 parts of butyl acetate, and the content was heated to 100° C. A mixture of 42.8 parts of methacrylic acid, 13.5 parts of methyl methacrylate, 43.7 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 8 with a weight average molecular weight of 10,000 and an acid value of 280 mg KOH/g.

[Anionic Group-containing Resin 9]

Into a four necked flask equipped with a stirrer, a condenser and a nitrogen gas introducing pipe was placed 180 parts of butyl acetate, and the content was heated to 100° C. A mixture of 30.0 parts of butyl maleate, 11.9 parts of methacrylic acid, 13.7 parts of methyl methacrylate, 44.4 parts of styrene, 7.2 parts of KAYA ESTER O-50TL as an initiator and 46 parts of butyl acetate was added dropwise over 1.5 hours while introducing nitrogen gas, and the polymerization was further carried out for 2 hours while keeping the mixture at the same temperature. The solvent was distilled off under reduced pressure to obtain anionic group-containing resin 9 with a weight average molecular weight of 10,000 and an acid value of 192 mg KOH/g.

<Preparation Example of Anionic Group-containing Resin Solution>

Each of anionic group-containing resins 1 to 9 was dissolved into a mixture of water and N,N-dimethylethanolamine whose amount was that required for neutralizing 100% of the acid value of each resin, to obtain each of anionic group-containing resin solutions 1 to 9 with a solid content of 30%.

<Examples Relating to Resin-coated Pigment>

[Pigment Dispersion]

71.5 parts of water was added to 13.5 parts of each of anionic group-containing resin solutions 1 to 9. 15 parts of a pigment (PRINTEX 80, manufactured by Degussa Corporation, carbon black) was added to the mixture and mixed with stirring. The resultant was kneaded with a wet circulation mill to give each of pigment dispersions 1 to 9.

[Resin-coated Pigment]

Each of pigment dispersions 1 to 9 was diluted with water so that the pigment concentration was 5%. A cation exchange resin (DOWEX MONOSPHERE 650C (H)650C manufactured by Dow Chemical Co., Ltd.) was added to the diluted solution in an amount of 5% based on the diluted solution and stirred, and the ion exchange was carried out until the pH was less than 4 to obtain each of resin-coated pigments 1 to 9. Then, the ion exchange resin was filtered off with a mesh and a moisture-containing cake (pigment concentration: 15%) containing each of resin-coated pigments 1 to 9 was obtained by means of suction filtration.

<Examples Relating to Preparation of Aqueous Pigment Dispersion by Re-Dispersion of Resin-coated Pigment>

[Aqueous Pigment Dispersions of Examples 1 to 9]

Triethylenediamine whose amount was that required for neutralizing 80% of the acid value of the resin in each of resin-coated pigments 1 to 9 and water whose amount was that required for adjusting the pigment concentration to 10% were added to each of moisture-containing cakes containing resin-coated pigments 1 to 9, and the mixture was stirred with a Disper to obtain each of aqueous pigment dispersions of Examples 1 to 9.

[Aqueous Pigment Dispersions of Comparative Examples 1 to 9]

71.5 parts of water was added to 13.5 parts of each of anionic group-containing resin solutions that were obtained by changing N,N-dimethylethanolamine in anionic group-containing resin solutions 1 to 9 to triethylenediamine. 15 parts of a pigment (PRINTEX 80 manufactured by Degussa Corporation, carbon black) was added to the mixture and mixed with stirring. The resultant was kneaded with a wet circulation mill and then was diluted with water so that the pigment concentration was 10%, to obtain each of aqueous pigment dispersions of Comparative Examples 1 to 9.

<Ink Compositions for Ink Jet Recording of Examples 1 to 9 and Comparative Examples 1 to 9>

39 parts of water, 15 parts of glycerin, 1 part of acetylene glycol and 5 parts of butyl triglycol (triethylene glycol monobutyl ether) were mixed with stirring to 40 parts of each of aqueous pigment dispersions of Examples 1 to 9 and Comparative Examples 1 to 9, to obtain each of aqueous pigment type ink compositions for ink jet recording of Examples 1 to 9 and Comparative Examples 1 to 9.

<Performance Evaluation of Aqueous Pigment Dispersions and Aqueous Pigment Type Ink Compositions for Ink Jet Recording>

They were evaluated by the evaluation methods below and the results are shown in Tables 1 and 2.

[Storage Stability]

The viscosities at 25° C. of the aqueous pigment dispersions and the aqueous pigment type ink compositions for ink jet recording of Examples 1 to 9 and Comparative Examples 1 to 9 and viscosities at 25° C. after storage for 10 days at 60° C. were measured. The storage stability was evaluated in terms of rise rate of viscosity.

Evaluation Criteria

A: The rise rate of viscosity is less than 1.1-fold.
B: The rise rate of viscosity is 1.1 to 1.5-fold.
C: The rise rate of viscosity is more than 1.5-fold.

[Performance Evaluation of Printed Article]

The aqueous pigment type ink compositions for ink jet recording of Examples 1 to 9 and Comparative Examples 1 to 9 were printed on plain paper (Xerox L manufactured by Xerox Corporation) and dedicated gloss paper (PM photo paper, manufactured by Seiko Epson Corporation) using a commercially available ink jet printer (EM-900C, piezo type, manufactured by Seiko Epson Corporation). The printed articles obtained were evaluated by the evaluation methods below.

Printing Density

The density of solid portion of printed articles was measured with a Macbeth optical densitometer RT-918 (manufactured by Gretag Macbeth Co.) and evaluated on the basis of the following criteria.

Plain Paper

A: The density is more than 1.20.
B: The density is more than 1.10 and not more than 1.20.
C: The density is not more than 1.10.

Dedicated Paper

A: The density is more than 2.00.
B: The density is more than 1.80 and not more than 2.00.
C: The density is not more than 1.80.

Gloss

The gloss of solid portion of the printed articles in which the ink compositions were printed on the dedicated paper was measured with a gloss meter (PG-1M manufactured by Nippon Denshoku Industries Co., Ltd.). The gloss was measured with a regular reflection of 60° and evaluated on the basis of the following criteria.
 A: The gloss is not less than 90.
 B: The gloss is not less than 80 and less than 90.
 C: The gloss is less than 80.

same method as mentioned above. The printed articles obtained by using the ink compositions for ink jet recording of Examples 10 to 13 and Comparative Examples 10 to 13 were evaluated by the same method as mentioned above. The results are shown in Tables 3 and 4.

TABLE 1

(Evaluation of aqueous pigment dispersions)

| | Ex. | | | | | | | | | Com. Ex. | | | | | | | | |
|---|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 | 9 |
| Acid value of resin | 50 | 80 | 120 | 145 | 160 | 200 | 240 | 280 | 192 | 50 | 80 | 120 | 145 | 160 | 200 | 240 | 280 | 192 |
| Storage stability | B | A | A | A | A | A | A | A | A | C | B | B | B | B | B | B | C | B |

TABLE 2

(Evaluation of ink compositions for ink jet recording)

| | Ex. | | | | | | | | | Com. Ex. | | | | | | | | |
|---|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 | 9 |
| Acid value of resin | 50 | 80 | 120 | 145 | 160 | 200 | 240 | 280 | 192 | 50 | 80 | 120 | 145 | 160 | 200 | 240 | 280 | 192 |
| Storage stability | A | A | A | A | A | A | A | A | A | C | C | B | B | B | B | C | C | C |
| Printing density of plain paper | A | A | A | A | A | B | B | B | B | B | B | B | C | C | C | C | C | C |
| Printing density of dedicated paper | B | A | A | A | A | A | A | A | A | C | B | B | B | B | B | B | B | B |
| Gloss of dedicated paper | B | B | B | A | A | A | A | A | A | C | C | C | C | B | B | A | A | B |

<Aqueous Pigment Dispersions of Examples 10 to 13>

Each of pigment dispersions 2, 4, 6 and 8 was diluted with water so that the pigment concentration was 10%. A cation exchange resin (DOWEX MONOSPHERE 650C (H)650C manufactured by Dow Chemical Co., Ltd.) was added to the diluted solution in an amount of 5% based on the diluted solution and stirred, and the ion exchange was carried out until the pH was 6.5. Then, the ion exchange resin was filtered off with a mesh to obtain each of aqueous pigment dispersions (pigment concentration: 10%) of Examples 10 to 13.

<Aqueous Pigment Dispersions of Comparative Examples 10 to 13>

Pigment dispersions 2, 4, 6 and 8 were diluted with water so that the pigment concentration was 10% to obtain aqueous pigment dispersions of Comparative Examples 10 to 13, respectively.

<Ink Compositions for Ink Jet Recording of Examples 10 to 13 and Comparative Examples 10 to 13>

39 parts of water, 15 parts of glycerin, 1 part of acetylene glycol and 5 parts of butyl triglycol (triethylene glycol monobutyl ether) were mixed with stirring to 40 parts of each of aqueous pigment dispersions of Examples 10 to 13 and Comparative Examples 10 to 13 to obtain each of aqueous pigment type ink compositions for ink jet recording of Examples 10 to 13 and Comparative Examples 10 to 13.

<Performance Evaluation of Aqueous Pigment Dispersions and Aqueous Pigment Type Ink Compositions for Ink Jet Recording>

The aqueous pigment dispersions of Examples 10 to 13 and Comparative Examples 10 to 13 and the ink compositions for ink jet recording of Examples 10 to 13 and Comparative Examples 10 to 13 were evaluated for storage stability by the

TABLE 3

(Evaluation of aqueous pigment dispersions)

| | Ex. | | | | Com. Ex. | | | |
|---|---|---|---|---|---|---|---|---|
| | 10 | 11 | 12 | 13 | 10 | 11 | 12 | 13 |
| Acid value of resin | 80 | 145 | 200 | 280 | 80 | 145 | 200 | 280 |
| Storage stability | A | A | A | A | B | B | B | C |

TABLE 4

(Evaluation of ink compositions for ink jet recording)

| | Ex. | | | | Com. Ex. | | | |
|---|---|---|---|---|---|---|---|---|
| | 10 | 11 | 12 | 13 | 10 | 11 | 12 | 13 |
| Acid value of resin | 80 | 145 | 200 | 280 | 80 | 145 | 200 | 280 |
| Storage stability | A | A | A | A | C | B | B | C |
| Printing density of plain paper | A | A | A | B | B | C | C | C |
| Printing density of dedicated paper | A | A | A | A | B | C | C | C |
| Gloss of dedicated paper | B | A | A | A | C | C | B | A |

The invention claimed is:

1. A process for producing a pigment coated with a resin, comprising the steps of:
 dispersing a pigment into an aqueous solution in which an anionic group-containing resin is dissolved in the presence of a basic compound, wherein the basic compound is used for dissolving the anion group-containing resin, and then removing the basic compound in the aqueous solution by using an inorganic ion exchanger or an ion exchange resin to precipitate the anionic group-containing resin on the surface of the pigment.

2. The process for producing a pigment coated with a resin of claim 1, wherein the basic compound in the aqueous solution is removed by replacing the cation of the basic compound by a hydrogen ion, using an organic ion exchanger and/or an inorganic ion exchanger as the ion exchange means.

3. The process for producing a pigment coated with a resin of claim 2, wherein substantially the whole amount of the basic compound in the aqueous solution is removed.

4. The process for producing a pigment coated with a resin of claim 2, wherein the ion exchange is carried out until the pH of the aqueous solution is less than 4.

5. The process for producing a pigment coated with a resin of claim 1, wherein the acid value of the anionic group-containing resin is 40 to 300 KOH mg/g.

6. A process for producing an aqueous pigment dispersion, comprising the steps of:

dispersing a pigment into an aqueous solution in which an anionic group-containing resin is dissolved in the presence of a basic compound, wherein the basic compound is used for dissolving the anion group-containing resin, and then partially removing the basic compound in the aqueous solution by using an inorganic ion exchanger or an ion exchange resin.

7. The process for producing an aqueous pigment dispersion of claim 6, wherein the basic compound in the aqueous solution is partially removed by replacing a portion of the cation of the basic compound by a hydrogen ion, using an organic ion exchanger and/or an inorganic ion exchanger as the ion exchange means.

8. The process for producing an aqueous pigment dispersion of claim 7, wherein the ion exchange is carried out until the pH of the aqueous solution is within a range of 4 to 8.

9. The process for producing an aqueous pigment dispersion of claim 6, wherein the acid value of the anionic group-containing resin is 40 to 300 KOH mg/g.

* * * * *